US007294219B2

(12) United States Patent
Arippol

(10) Patent No.: US 7,294,219 B2
(45) Date of Patent: Nov. 13, 2007

(54) LABEL-SEAL MANUFACTURING METHOD AND THE RESULTING IMPROVED LABEL-SEAL

(76) Inventor: Jefrey Arippol, Av. Dracena, 450 Jaguare 05329-000, Sao Paulo, SP (BR)

( * ) Notice: Subject to any disclaimer, the term of this patent is extended or adjusted under 35 U.S.C. 154(b) by 178 days.

(21) Appl. No.: 10/938,858

(22) Filed: Sep. 9, 2004

(65) Prior Publication Data

US 2006/0051550 A1 Mar. 9, 2006

(30) Foreign Application Priority Data

Aug. 25, 2004 (BR) .................................... 0403736

(51) Int. Cl.

| | |
|---|---|
| ***B29C 65/50*** | (2006.01) |
| ***B32B 37/12*** | (2006.01) |
| ***B32B 37/20*** | (2006.01) |
| ***B32B 38/10*** | (2006.01) |
| ***B32B 38/04*** | (2006.01) |
| ***B32B 38/14*** | (2006.01) |

(52) U.S. Cl. ....................... 156/152; 156/247; 156/254; 156/256; 156/259; 156/271; 156/277

(58) Field of Classification Search ................ 156/152, 156/247, 250, 254, 256, 259, 269, 271, 277
See application file for complete search history.

(56) References Cited

U.S. PATENT DOCUMENTS

| | | | | |
|---|---|---|---|---|
| 3,518,145 | A * | 6/1970 | Christensen | ................ 156/248 |
| 4,300,700 | A | 11/1981 | Chang | |
| 4,956,962 | A | 9/1990 | Williams | |
| 5,051,263 | A | 9/1991 | Barry et al. | |
| 5,078,509 | A | 1/1992 | Center et al. | |
| 5,277,864 | A | 1/1994 | Blatz | |
| 5,405,629 | A | 4/1995 | Marnocha et al. | |
| 5,582,853 | A | 12/1996 | Marnocha et al. | |
| 5,626,250 | A | 5/1997 | Dorazio | |
| 5,639,529 | A | 6/1997 | Gozdecki | |
| 5,707,470 | A | 1/1998 | Rajala et al. | |
| 5,711,847 | A | 1/1998 | Rajala et al. | |
| 6,461,708 | B1 | 10/2002 | Dronzek | |
| 6,502,986 | B1 | 1/2003 | Bensur et al. | |

(Continued)

OTHER PUBLICATIONS

U.S. Appl. No. 10/867,769, filed Jun. 25, 2004, Arippol.

(Continued)

*Primary Examiner*—Chris Fiorilla
*Assistant Examiner*—Sing P. Chan
(74) *Attorney, Agent, or Firm*—Stattler-Suh PC

(57) ABSTRACT

A method for manufacturing multiple label-seals is described, wherein a self-adhesive material having a tape, an intermediate adhesive layer, and a liner coupled to the tape via the adhesive layer is fed, at least one first printing layer is printed successively onto a tape region of the tape to form each corresponding label, at least one unprinted tape region of the tape adjacent to the printed tape region is further cut and extracted, at least one heat-shrinkable plastic film is further mounted onto the printed tape region of the tape to form each corresponding seal, and the label-seals are finally cut and separated on the liner by removing skeleton portions of the printed tape region and the heat-shrinkable plastic film adjacent to the label-seals.

10 Claims, 9 Drawing Sheets

U.S. PATENT DOCUMENTS

| | | | | |
|---|---|---|---|---|
| 6,537,401 | B2 | 3/2003 | Couillard et al. | |
| 6,540,854 | B2 | 4/2003 | Couillard et al. | |
| 6,547,903 | B1 | 4/2003 | McNichols et al. | |
| 6,585,153 | B2 | 7/2003 | Ryan | |
| 6,594,927 | B2 | 7/2003 | Witkowski | |
| 6,613,171 | B2 | 9/2003 | McNichols et al. | |
| 6,620,270 | B2 | 9/2003 | Ehlert et al. | |
| 6,634,539 | B2 | 10/2003 | Mlinar et al. | |
| 6,668,892 | B2 * | 12/2003 | Vasilakes et al. | 156/387 |
| 6,676,003 | B2 | 1/2004 | Ehlert et al. | |
| 6,685,046 | B2 | 2/2004 | Ogino | |
| 6,685,085 | B2 | 2/2004 | Hanna | |
| 6,723,360 | B1 | 4/2004 | Dunaway | |
| 6,733,855 | B1 | 5/2004 | Scott | |
| 7,022,197 | B2 | 4/2006 | Sitzmann | |
| 7,025,841 | B2 | 4/2006 | Owen | |
| 2002/0055586 | A1 | 5/2002 | Dalgewicz, III et al. | |
| 2003/0056410 | A1 | 3/2003 | Witkowski | |
| 2003/0217489 | A1 | 11/2003 | Witkowski | |
| 2006/0054268 | A1 | 3/2006 | Sells | |

OTHER PUBLICATIONS

U.S. Appl. No. 11/201,022, filed Aug. 9, 2005, Arippol.
U.S. Appl. No. 11/473,216, filed Jun. 21, 2006, Arippol.
PCT International Search Report for International Application No. PCT/US2006/004226 dated Jul. 5, 2006.

* cited by examiner

LABEL-SEAL MANUFACTURING METHOD AND THE RESULTING IMPROVED LABEL-SEAL

CROSS-REFERENCES TO RELATED APPLICATIONS

This application claims the benefit of Brazilian Patent No. PI 0403736-7, of 25 Aug. 2004.

BACKGROUND OF THE INVENTION

1. Field of the Invention

The present invention relates to a label-seal manufacturing method, which belongs to the field of labels and similar self-adhesives and that was developed to provide an optimized way to produce this label.

2. Art Background

The object of another patent claim, from the same applicant, is already known, registered under number MU 82013750-6, this label-seal comprises: a self-adhesive label and a seal or closing comprising: a heat-shrinkable plastic film tape, one side of which remains adhered, for example, to the label's upper side and, from this side the tape mentioned above has an adequate width to extend itself beyond the gap between the recipient and the packaging cover and, preferably, beyond the cover upper face; such label containing the seal is applied on the packaging recipient by means of the usual technique used to apply self-adhesive articles, therefore, the shrinkable plastic tape projects beyond the gap between the recipient and the cover and beyond the upper face of the later, being further submitted to a heat source that causes it to shrink, curve and adhere to the recipient side, the packaging cover and over its upper face. Under these conditions, when the recipient cover is removed, the plastic film ruptures and the opening is then irreversibly marked and if it was done in an unauthorized way this can be evidenced.

This label-seal is produced by means of an appropriate process, that, although adequate, has being the subject of studies intended to improve it.

SUMMARY AND OBJECTS OF THE INVENTION

The method, covered by the present patent, is the result of one of these studies and it makes possible to manufacture the abovementioned label in an optimized way, under both the technical and the economical point of view.

Another advantage of this method is the fact that it is composed by well-known operations in the field of the manufacturing of self-adhesive articles, with the only difference that they are adequately organized for the optimized production of the present label.

Another advantage is that the present method is carried out by the usual equipment for this technique, just conveniently arranged for the optimized production of the label.

Still another advantage provided by the present method is the production of an improved label-seal regarding the original.

The present summary refers to an invention patent for the label-seal and improved label-seal manufacturing method, belonging to the field of labels and similar self-adhesives and that were developed to provide an optimized way to produce this label; such method comprises, essentially, the stages of: A)—Feeding the self-adhesive material tape formed: by a paper, plastic or similar (2) tape; rear adhesive layer (4); and liner (5); B)—First printing performed in the lower region (2)' of tape (2); C)—Cutting and extraction of the upper tape (2)" part made of paper, plastic or similar (2) that is not used; D)—Delamination of the self-adhesive material (2)'-(4)-(5) to separate liner (5) of the lower tape (2)' region; E)—Mounting of the heat-shrinkable plastic film (11) in the lower tape (2)' region, gluing their overlapped edges; F)—Liner relamination; G) Eventual, printing over the plastic film (11);—H)—Cutting for the formation of label-seals and rewinding of the "skeleton"; and I)—Winding of the label-seal tapes (1)-(10)-(5); label-seal (1)-(10) remains with the plastic film gluing edge (11) under the label body edge (2) and glued to it through its own adhesive (4) of the later and within these solutions of the method and label being foreseen varieties for the label-seal (1)-(10) production with upper film (11) or film upper (11) and lower (11)' and in such a way that these films are glued under the label (1) with their own rear adhesive (4) or over the label (1) with front glue fillets (100), (100)' appropriate for this gluing.

BRIEF DESCRIPTION OF THE DRAWINGS

The attached drawings refer to the label-seal and label-seal manufacturing method, covered by the present patent, in which.

DETAILED DESCRIPTION

Figure 1:
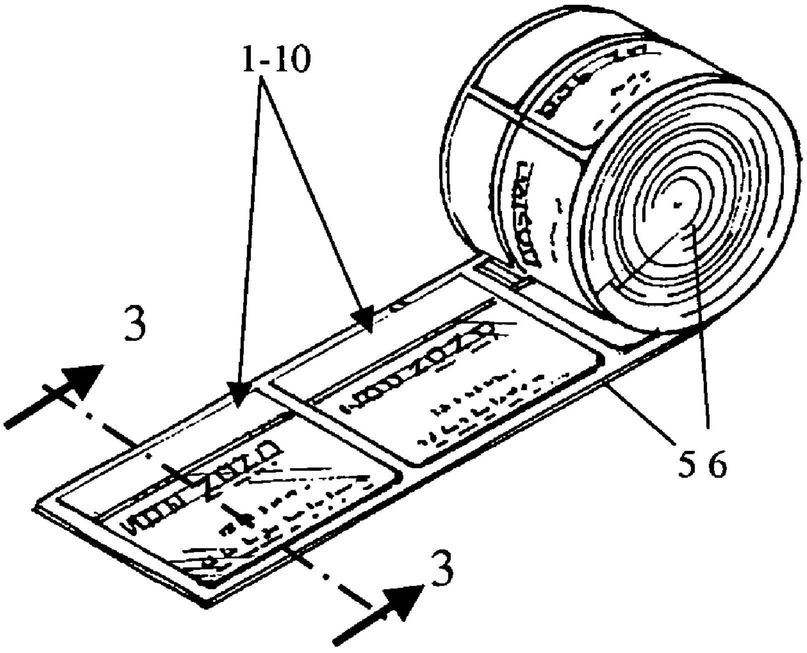
FIG. 1 shows a type of label-seal obtained by this method, which is formed by a self-adhesive label and by a heat-shrinkable plastic film, composed by the seal, foreseen only in the upper side of the self-adhesive label and glued under its edge with the pressure-sensible adhesive layer also called self-adhesive label.

According to the illustrations in the abovementioned figures, the method, covered by the present invention patent, is intended for the manufacturing of the self-adhesive 1-10 label-seal comprising, essentially (FIG. 1): the self-adhesive label 1 itself; and a seal or closing 10, formed by, at least, a heat-shrinkable plastic body 11, an edge of which remains glued, for example, on the upper edge of label 1 and starting from the mentioned edge, the heat-shrinkable plastic body 11 is sufficiently wide to extend beyond the gap between the recipient and the cover of the packaging receiving the label-seal 1-10 and preferably beyond the upper face of the cover.

The self-adhesive label 1 is composed by a paper, plastic or similar body 2 having a front printed layer 3 constituting the label itself; rear pressure-sensible adhesive layer 4, which adheres to the packaging recipient, but which was originally glued and protected by a supporting paper or silliconed plastic tape (liner) 5, to which a number of label-seals 1-10 are glued and, which is supplied in the coil 6.

The heat-shrinkable plastic body 11, by its turn, can also feature a printing 12 and/or a number of parallel cuts that define the tapes 13, extended from the glued edge to the label and destined to make the accommodation to the packaging easier.

Therefore, the label-seal 1-10 manufacturing method, described above, is carried out in an equipment which entrance end continuously feeds, from an unwinding device 50, a tape of self-adhesive material 2-4-5 (paper, plastic or other material 2, rear adhesive layer 4 and liner 5), which continuously passes through stations that perform many stages, A through I, of the method, sequentially positioned and, from the opposite end of the mentioned machine comes out the finished label-seal 1-10-5 tape that is pulled and rewound by the winder 61 of the equipment.

Figure 2:
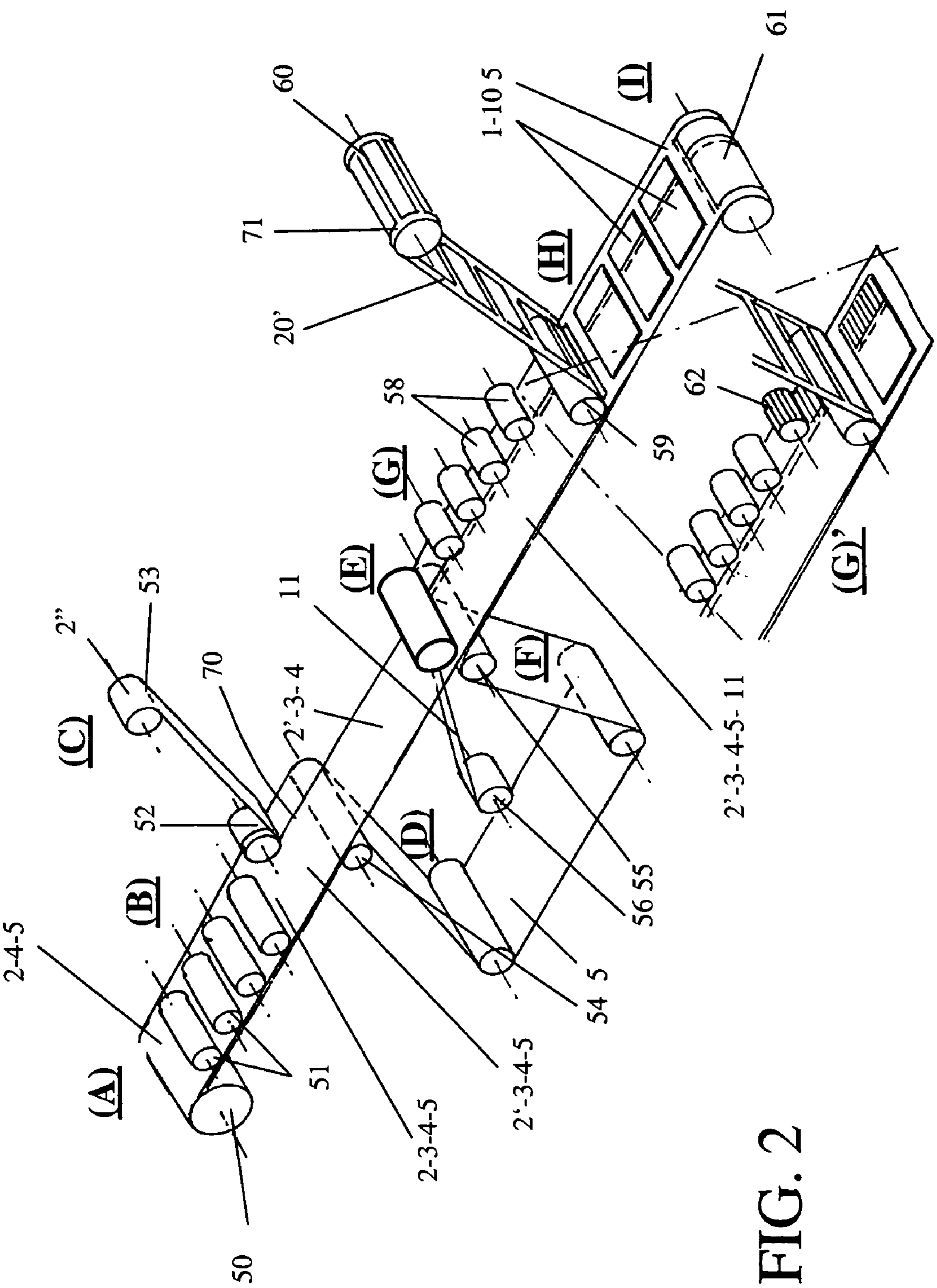
FIG. 2 shows a sketch of the manufacturing method do label above.

Therefore, the method is comprised, essentially, by the stages of (FIG. 2):

A)—Feeding, accomplished by the manufacturing equipment's entry unwinder 50 that provides and feeds a self-adhesive material tape 2-4-5, composed by a paper, plastic or front similar tape 2, pressure-sensible intermediate adhesive layer 4 and paper, plastic or another silliconed (liner) 5 rear layer;

B)—First printing, performed by the first printing station 51 of the manufacturing equipment that prints a number of printing layers 3 that constitutes, successively, the labels themselves along the lower region 2' of the paper, plastic or similar tape 2, so, from this point on tape 2-3-4-5 starts forming and circulating in the machine the, composed by the paper, plastic or similar tape 2 featuring the printing 3 in its lower region 2' that is glued by means of the pressure-sensible adhesive layer 4 to the liner tape 5;

C)—Cutting and extraction of the upper part 2" of the paper, plastic or similar tape 2 that is not used, performed by the knife 52 and the rewinder 53 that belong to the manufacturing equipment and that performs the continuous longitudinal cut 70 made between the upper 2" and lower 2' regions of the paper, plastic or similar tape 2 and without cutting liner 5 and the delamination (ungluing) and rewinding of the extracted tape corresponding to the upper tape region 2", so, from this point on a self-adhesive material tape 2'-3-4-5 is formed, composed by a paper, plastic or similar tape comprised by the lower region 2' of the original tape already containing the printing 3 that constitute the label itself and that is glued by means of the pressure-sensible adhesive 4 over the corresponding lower region of the liner tape 5;

D)—Delamination of the self-adhesive material tape 2'-3-4-5 performed by the delaminator 54 of the manufacturing equipment and comprised by the delamination (ungluing) and separation of the lower tape region 2' of liner 5, so, from this point on the lower tape region 2', containing the front printing 3 and the rear pressure-sensible adhesive 4, and the liner 5 start moving separately along the machine;

E)—Mounting of the heat-shrinkable plastic film performed by a laminator 55 and a plastic film unwinder 56 of the manufacturing equipment and that will use the heat-shrinkable plastic film 11 tape; unwinding it in the direction of the lower tape region 2' (containing the printing 3 and adhesive 4) so the edge of the mentioned heat-shrinkable plastic film 11 tape facing the said lower tape region 2' constitutes a gluing edge and is placed parallel to and under the upper edge of the mentioned lower tape region 2'; and lamination (gluing) of the mentioned edges overlapped by means of the pressure-sensible adhesive layer 4 itself of the lower tape region 2';

F)—Liner relamination, performed preferably at the relamination station 55 of the manufacturing equipment and simultaneously to the lamination of the heat-shrinkable plastic film 11, comprised by the relamination (regulating) of liner 5 on the tape composed by the heat-shrinkable plastic tape 11 and lower tape region 2', glued one to the other by adhesive 4, so, from this point on, tape 2'-3-4-5-11 is formed composed by the heat-shrinkable plastic 11 tapes and lower tape region 2' made of paper, plastic or similar material (containing the printing 3 and adhesive 4) glued one to the other and glued to liner 5;

G)—Eventually, the second printing performed by the printing station 58 of the manufacturing equipment and that prints over the heat-shrinkable plastic material tape 11 glued to lower tape region 2';

H)—Cutting, for the formation of the label-seals and rewinding of the "skeleton" performed by knife 59 and rewinder 60 of the manufacturing equipment and that performs the cut (s) 71 that define the contours of the label-seal, made on the tape composed by the heat-shrinkable plastic tapes 11 and lower tape region 2', thus separating the label-seals 1-10 one from the other and from the skeleton 20' (regions adjacent to the labels); the said stage is also comprised by the rewinding of skeleton 20', so, from this point on a finished tape of label-seals 1-10-5 is formed, composed by a number of label-seals 1-10 glued at regular spaces on liner tape 5; and I)—Rewinding of the finished label-seal tapes 1-10-5 performed in the rewinder 61 located in the exit of the manufacturing equipment and from which the entire tape is pulled to circulate through the equipment and that rewinds the finished label-seal tapes 1-10-5 composed by the label-seals 1-10 glued on liner 5, to form label-seal coil 6.

The printing stages are performed in one or two or three or four colors, according to the needs.

Figure 3:
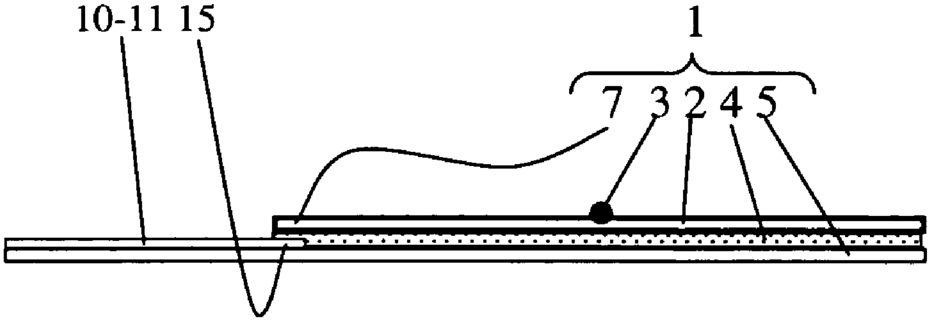
FIG. 3 shows the improved label-seal obtained by the method and its section indicated in figure one.

The label-seal 1-10, obtained through the method described above, comprises as the improved detail (FIG. 3), the fact that the heat-shrinkable plastic film 11 section, constituting seal 10, remains with its gluing edge 15 placed under the corresponding gluing edge 7 of body 2 of the self-adhesive label 1 and glued to it by means of its own pressure-sensible adhesive layer 4 after body 2.

Figure 4:
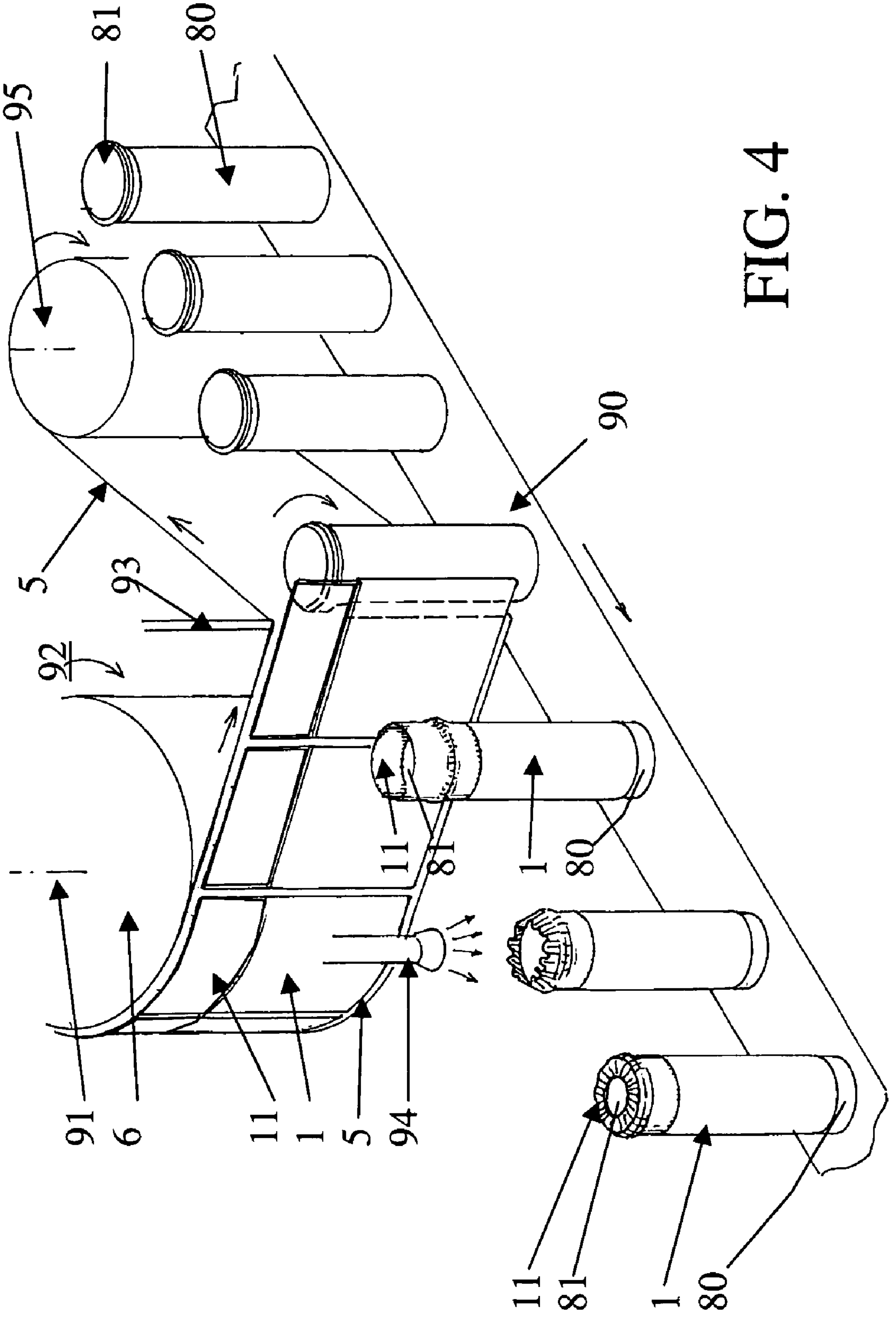
FIG. 4 shows the sketch of an example of application of the label in a lot of a type of packaging.
Figure 5:
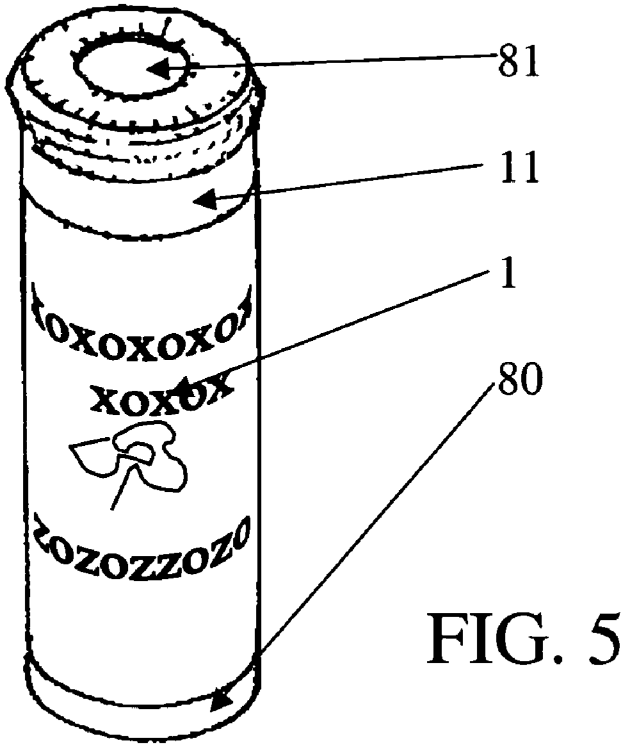
FIGS. 5 through 9 show examples of packaging that may employ the label-seal.
Figure 6:
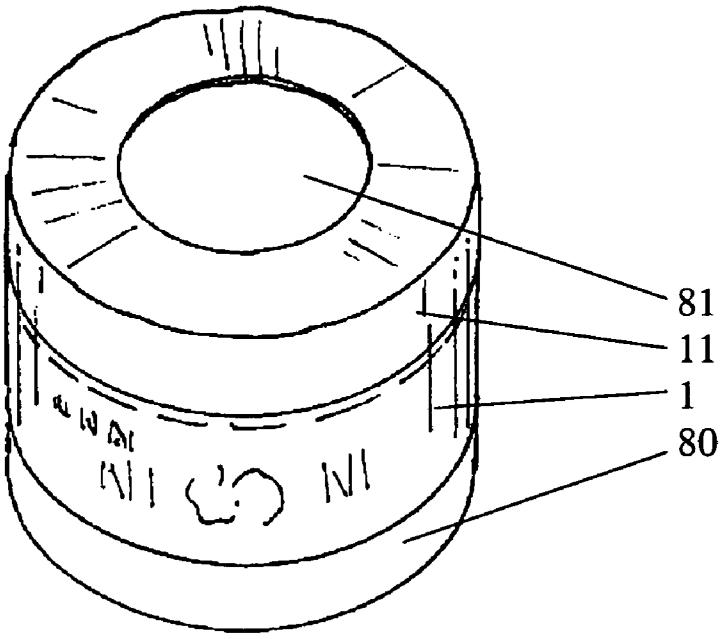
Figure 7:
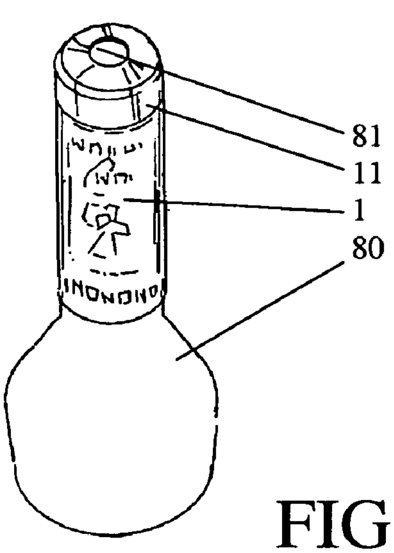

The present label-seal 1-10 is used in packaging composed by recipient 80 and cover 81 (FIGS. 4 and 5) and is applied by means of usual techniques and equipment for the application of conveniently adapted self-adhesive articles.

Such technique comprises, for example (FIG. 4): Displacing a row of packaging 80-81 already filled up and closed with cover 81 to be labeled and sealed, through, for example, belt conveyor 90. Unwind a coil 6 with label-seal tapes 1-10-5 using the adequate device 91 and displace it so it will pass by point 92, close to which passes the packaging 80-81 one after the other. At this point 92, detach, using the adequate device 93, label-seals 1-10, one after the other, from the supporting stripe 5 and transfer them to the respective receptacles 80 of packaging 80-81 that pass by the mentioned point 92, which, in this case, are submitted to rotation. After that, the label-seals 1-10 remains glued to the side of receptacle 80 of the packaging and the heat-shrinkable plastic film tape 11 remains around receptacle 80 and cover 81 and projected above the plane of the latter's upper face. Further, the technique for label-seal application on the packaging comprises in making packaging 80-81, with labels 1-10 already glued, pass one after the other by heat source 94 that is adequate to shrink the shrinkable plastic film tape 11, curve it and mold it around receptacle 80 and cover 81 and over the upper face of the later. Rewind the supporting tape 5 in the adequate device 95.

At the end of the application (FIG. 5), label 1 remains glued and placed around receptacle 80 and the seal 10 (plastic film) molded around receptacle 80 and the side and upper face of cover 81, thus accomplishing the labeling and sealing of the packaging.

The opening of cover 81, therefore, will only be possible by the rupture of the plastic tape 11, thus evidencing the violation of the packaging if the opening has been made without authorization.

Within the basic construction, described above, the method and the label-seal, covered by the present invention patent, may present modifications regarding material, dimensions, construction and/or functional configuration and/or ornamental details, without departing from the requested coverage.

Therefore, the label body 2 is obtained from paper or plastic, in this case from: BOPP; PVC; Polyethylene; Polyester or others normally used.

The heat-shrinkable plastic film can be made, preferably, of Polyvinyl Chloride—PVC or optionally of PET; PET-G; OPS; BOPP; OPP; PE and similar shrinkable films. The thickness can be from 20 to 100 microns, preferably 25 to 50 microns. Shrinking in the MDO direction 12% a 75%, preferably 20% a 50% and in the TDO direction 0 to 10% and preferably 0 to 5%.

The adhesive, composed by adhesive layer 4, can be any of those normally used in the manufacturing of self-adhesive articles, as hot melt, acrylic and others.

The protection and supporting tape 5 can be made of paper or plastic, coated with sillicon (silliconed) or other usual material.

Figure 10:
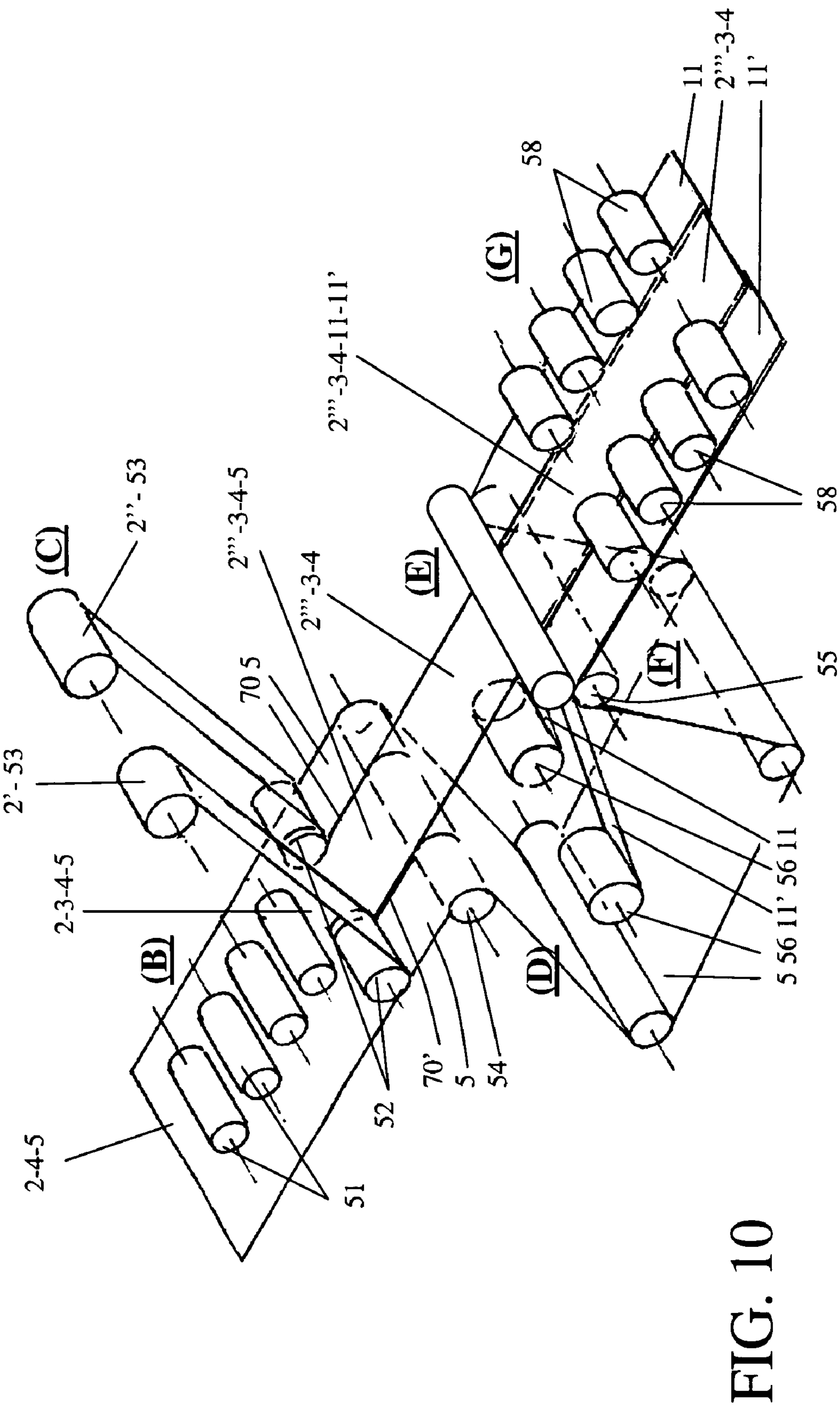
FIGS. 10 and 11 show a sketch of a variety of the method and of the label-seal obtained, which is formed by an intermediate self-adhesive label and two sections of the upper and lower heat-shrinkable plastic film, composed by the seal, glued under the upper and lower sides upper and lower of the self-adhesive label with its own rear adhesive layer.

Optionally, another possibility to perfume the method comprises stages (FIG. 10):

B)—First printing, performed by first printing station 51 of the manufacturing equipment that prints a number of printing layers 3 constituting the label itself successively along the central tape region 2''' of the paper, plastic or similar tape 2;

C)—Cutting and extraction of the upper 2'' and lower 2' parts of the paper, plastic or similar tape 2 that is not used, performed by two sets of knife 52 and rewinder 53 belonging to the manufacturing equipment, which performs continuous longitudinal cuts 70 and 70' in paper, plastic or similar tape 2, performed between the upper 2'' and central 2''' regions and between this one and the lower tape region 2', without cutting liner 5 and delaminating (ungluing) and rewinding the tapes extracted corresponding to the tape's upper 2'' and lower 2' regions, so, from this point on, a self-adhesive material tape is formed, composed by a paper, plastic or similar tape composed by the central region 2''' of the original tape, containing the printing 3 that constitutes the label itself, glued by adhesive 4 over the corresponding central region of the liner tape 5;

D)—Delamination of the central tape region 2''' performed by delaminator 54 of the manufacturing equipment, which delaminates (detaches) and separates the central tape region 2''' of liner 5, so, from this point on, central tape region 2''' and liner 5 start to move separately along the machine;

E)—Mounting of the heat-shrinkable plastic film performed by laminator 55 and the plastic film unwinders 56 of the manufacturing equipment, which foresees two upper 11 and lower 11' heat-shrinkable plastic film tapes; the unwinding of these tapes 11, 11' in the direction of the central tape region 2''', so the edges of such tapes 11, 11' facing central tape region 2''', constitute gluing edges placed under and parallel to the corresponding upper and lower gluing edges of the later; and the overlapped lamination (gluing) of these edges by their own pressure-sensible adhesive layer 4 of central tape region 2''', so, from this point on tape 11-2'''-11' is formed, composed by upper 11 and lower 11'' heat-shrinkable plastic tapes interposed by central tape region 2''' of paper, plastic or similar tape, glued one to the other by means of pressure-sensible adhesive layer 4;

G)—Eventually, second printing performed by two printing stations 58 of the manufacturing equipment that prints over the upper 11 and lower 11' plastic material heat-shrinkable tapes glued to central tape region 2'''.

Stages A, F, H and I in the present execution of the process remain substantially equal to the first version.

Figure 11:
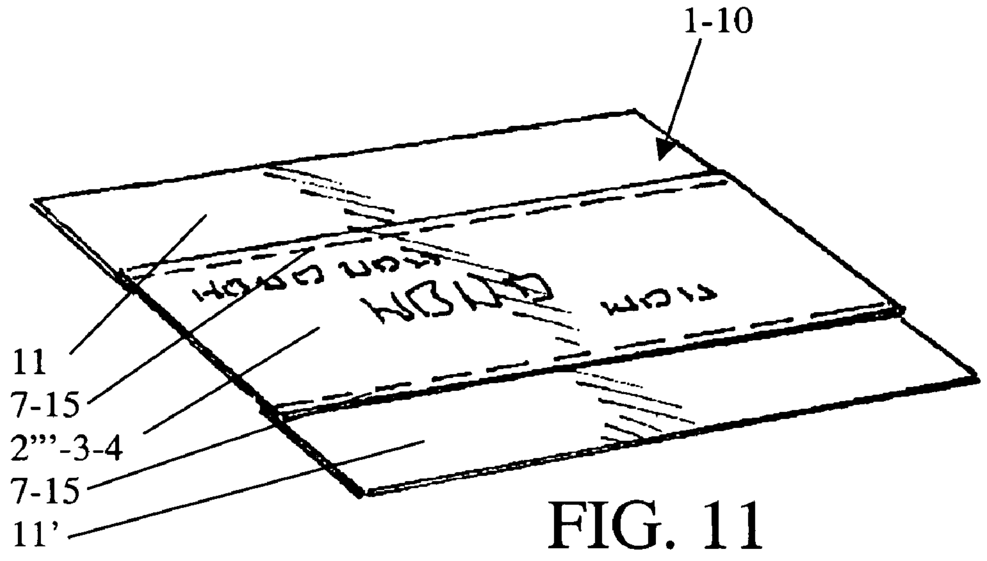

Label-seal 1-10, obtained by this second possibility of performing the method is comprised by (FIG. 11): the self-adhesive label 1 placed centrally; and by the upper 11 and lower 11' sections of heat-shrinkable plastic film constituting seal 10, in such a way that the upper 11 film has its lower edge 15 glued under upper edge 7 of label 1 and the lower film section 11' has its upper edge 15' glued under lower edge 7' of label 1 by means of the pressure-sensible adhesive layer 4 of label 1.

In another possibility of performing the method, instead of the self-adhesive material tape 2-4-5 have its liner 5 delaminated; the shrinkable film 11 being glued to the rear face of the self-adhesive material tape 2-4-5, through its own adhesive layer 4 and liner 5 being relaminted, as it happens in stages D, E and F of the methods above described; shrinkable film 11 is glued over the front face of the self-adhesive material tape 2-4-5 through the application of an appropriate glue for this purpose.

Figure 12:
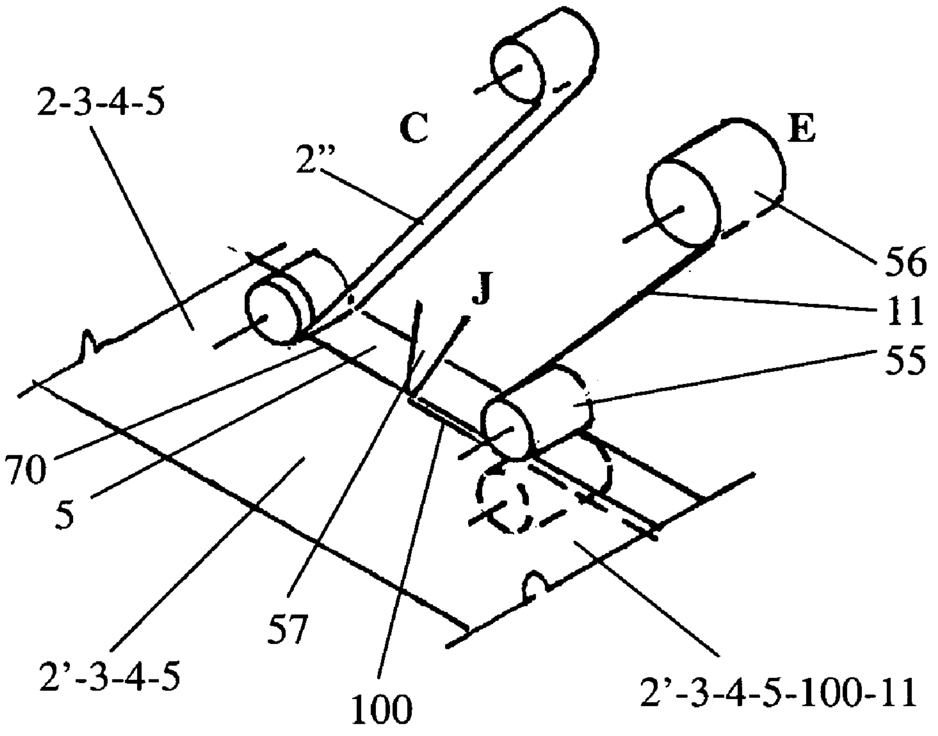
FIGS. 12 and 13 show a sketch of a variety of the method and of the label-seal obtained, the later formed by the self-adhesive label and by the heat-shrinkable plastic film that constitutes the seal, only foreseen in the side upper of the self-adhesive label and glued over its upper edge with a front glue fillet specific for this kind of gluing.

Under these conditions, after the cutting, extraction and rewinding of stage C, part of upper tape 2'' that is not used forming lower tape region 2' that is used or the cutting, extraction and rewinding of the upper 2'' and lower 2' parts, which are not used forming the central tape region 2''' that is used, made by the usual ways as in the methods described above. A stage J, is foreseen, composed by the glue dispenser 57 that applies one glue fillet 100 (FIG. 12) over the front face of the upper edge of the lower tape region 2' or stage J', composed by two glue dispensers 57, 57' and composed by the application of two glue fillets 100, 100' (FIG. 14) over the front face of the upper and lower edges of the central tape region 2'''; and stage E, mounting of the heat-shrinkable plastic film performed by the laminator set 55 and plastic film unwinder 56 of the manufacturing equipment that unwinds the upper 11 heat-shrinkable plastic film tape (FIG. 12) in the direction of the lower tape region 2', so its edge facing the later, constitutes a gluing edge and remain parallel and overlapped to the upper gluing edge of the mentioned lower tape region 2' that contains the glue fillet 100 or the said stage E is formed by the unwinding of two heat-shrinkable plastic film tapes, one upper 11 and the other lower 11' (FIG. 14) in the direction of the central tape region 2''', so the edges of the said tapes 11, 11' facing the later one, constitute gluing edges and remain parallel and overlapped to the upper and lower gluing edges of the said central tape region 2''' that contains the upper 100 and lower 100' adhesive fillets and the lamination (gluing) of the referred edges overlapped by means of the appropriate 100 or 100 and 100' adhesive fillets, so, from this point on, tape 2'-3-4-5-11 is formed, composed by lower tape region 2' of the self-adhesive original tape (containing front printing 3 and rear adhesive 4) and an upper region composed by heat-shrinkable film 11 glued over the front face of the upper edge of lower tape region 2' by the appropriate glue fillet 100 or a tape 2'''-3-4-5-11-11' is formed, composed by the region central 2''' of the original self-adhesive tape (containing front printing 3 and rear adhesive 4) and one upper 11 and lower 11' region composed by the heat-shrinkable plastic film glued over the front face of the upper and lower edges of central tape region 2''' by means of two upper 100 and lower 100' appropriate glue fillets.

Stages A, B, C, G, H, I are substantially equal to the methods described above.

Figure 13:
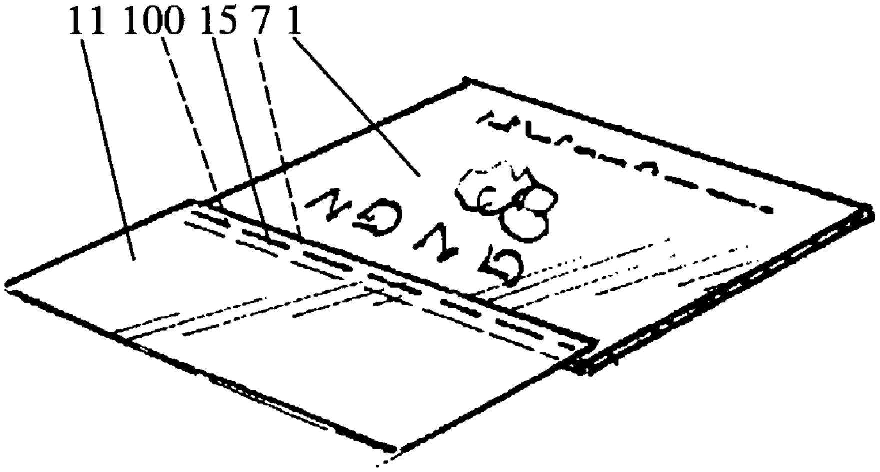

The label-seal obtained by the method as described above, is comprised, essentially (FIG. 13): by the self-adhesive label 1 (formed by the lower original tape region 2' of self-adhesive material 2-4-5, with printing 3 and adhesive 4); and by the section of upper shrinkable plastic film 11 constituting seal 10 with its lower edge 15 glued over the upper edge 7' of label 1 through the glue fillet 100, appropriate for this gluing.

Figure 14:
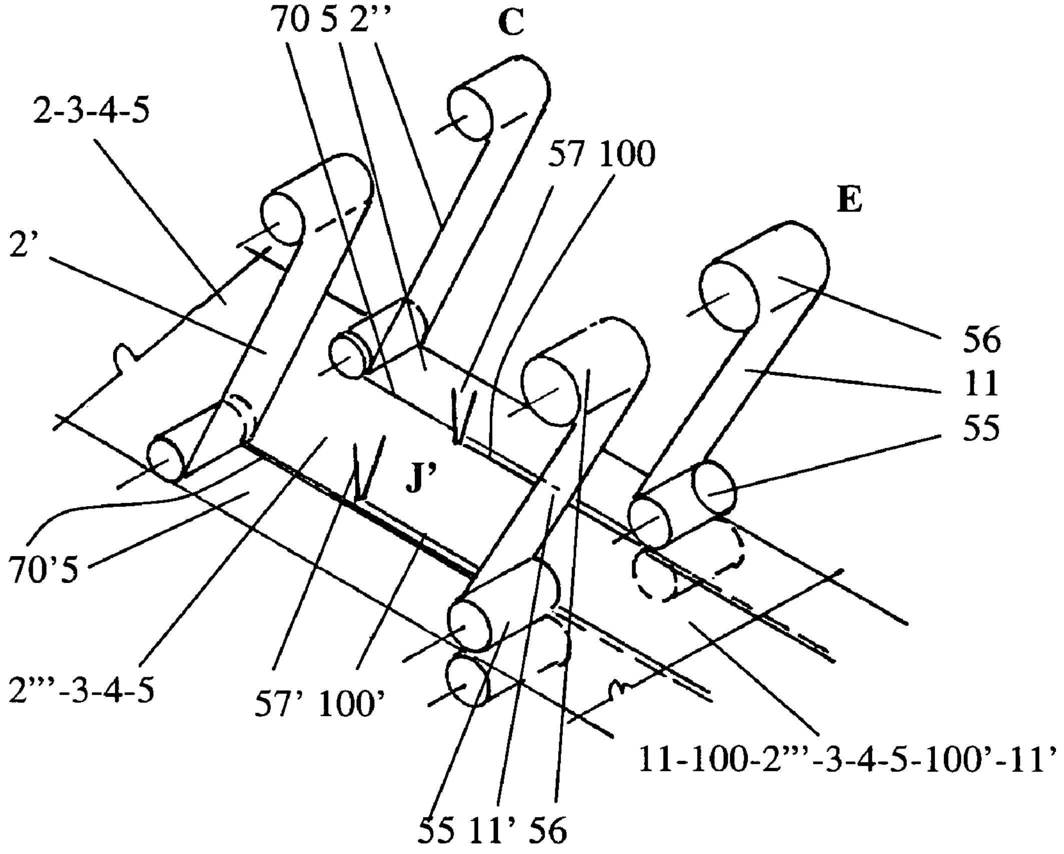
FIGS. 14 and 15 show a sketch of a variety of the method and of the label-seal obtained, which is formed by an intermediate self-adhesive label and two sections of upper and lower heat-shrinkable plastic film, composing the seal, glued over the upper and lower side of the self-adhesive label with front glue fillets specific for this kind of gluing.
Figure 15:
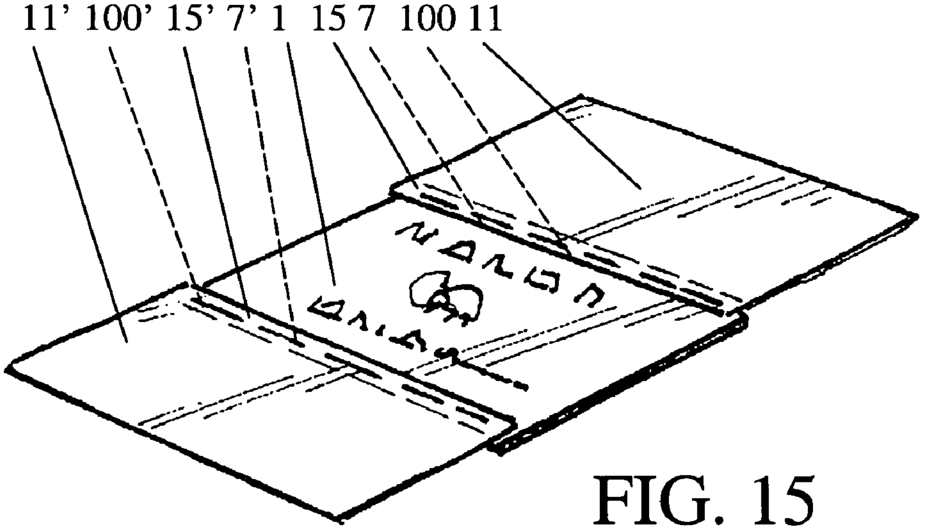

In the method accomplishment form shown in FIG. 14, the label-seal is comprised: (FIG. 15) by the self-adhesive label 1 (formed by the central original tape region 2''' of self-adhesive material 2-4-5, having printing 3 and adhesive 4); and by one upper 11 and one lower 11' section of shrinkable plastic film that constitutes seal 10, in such a way that the upper shrinkable plastic film section 11 remains with its lower edge 15 glued over the upper edge 7 of label 1 through the upper glue fillet 100 and the lower shrinkable plastic film section 11' remains with its upper edge 15' glued over the lower edge 7' of label 1 through the lower glue fillet 100', being these glue fillets appropriate for this gluing.

Figure 16:
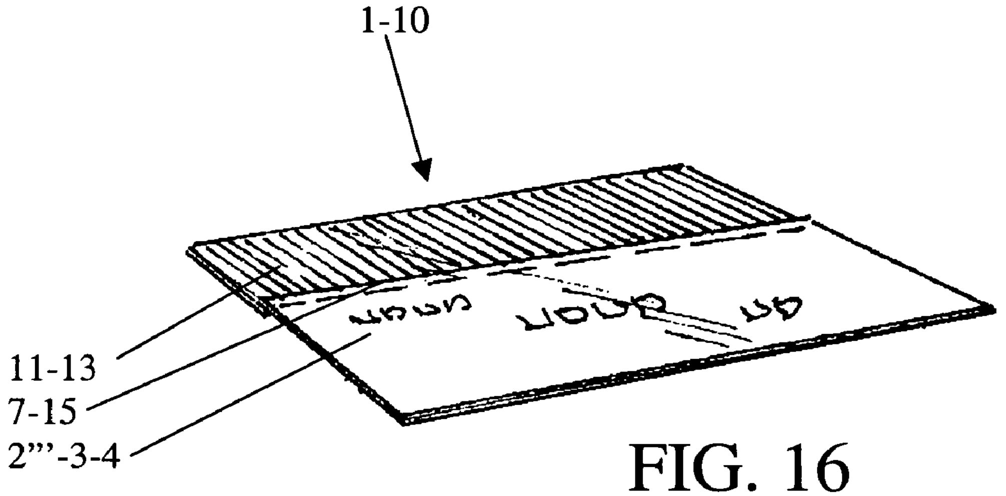
FIGS. 16 and 17 show another possibility of applying only the label to a packaging; this label foresees the plastic film formed by transverse bands that accommodate to the packaging profile and which can be achieved by the four varieties of the method.
Figure 17:
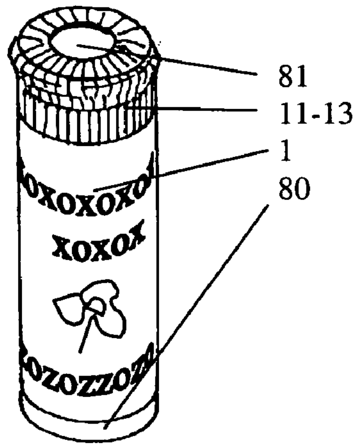

Optionally, the method to produce label-seals 1-10 with an upper film section 11 or with an upper film section 11 and other lower 11', glued under the body of label 2', 2''' with the own pressure-sensible adhesive layer 4 or glued over the body of label 2', 2''' with glue fillets 100 or 100 and 100' appropriate for this gluing, comprises an additional stage G' of shrinkable plastic film cutting, performed after stage G of printing over it, through the appropriate single or double knife 62 of the manufacturing equipment, which performs parallel cuts in the direction of the glued edge in label 1 towards the free edge of the shrinkable plastic film 11, to form the accommodation stripes 13, as shown in FIGS. 16 and 17.

Figure 18:
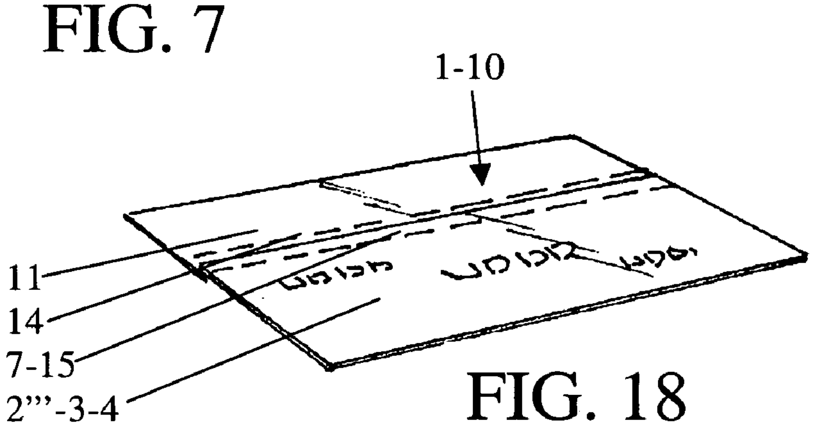
FIGS. 18 and 19 show another possibility of applying only the label to a packaging; this label foresees the plastic film with a punched line that can be achieved by the four varieties of the method.
Figure 19:
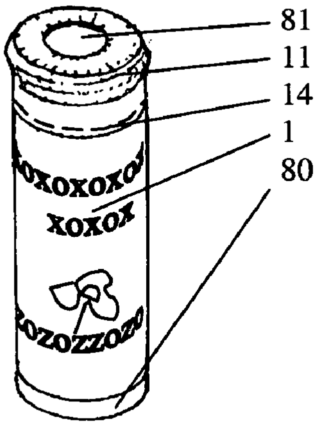

Optionally, stage G' is a stage for punching the upper 11 or upper 11 and lower 11' shrinkable plastic film sections, made with another type of knife of the manufacturing equipment and that produces the punching line(s) 14 parallel and close to the edge(s) of label 1 (FIG. 18) and destined to favor the rupture of the film when opening the packaging (FIG. 19).

Figure 9:
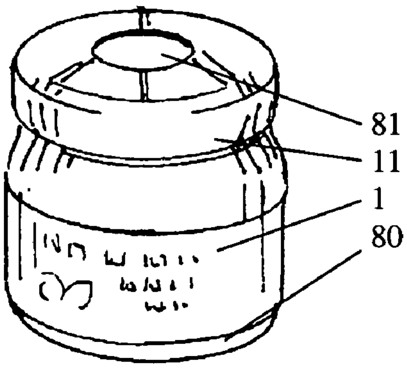
Figure 8:
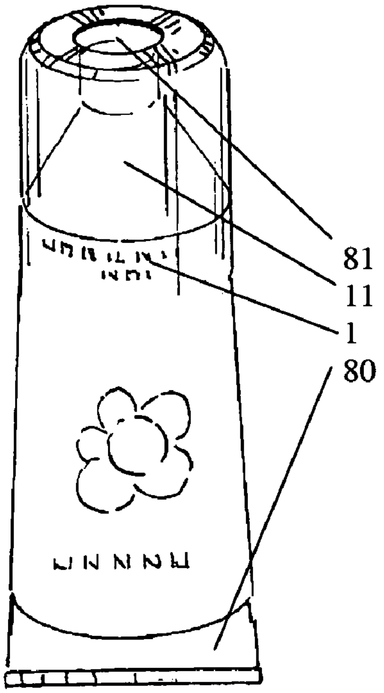

The label-seals 1-10 obtained by the methods described may be used for several types de packaging, as those shown in FIGS. 4 through 9, as cylindrical tubes (FIGS. 4 and 5) used to package, for example, tablets and similars; or flasks as shown in 6, 7; or used in a tube of the type that has an over-cover as shown in FIG. 8; or in pots shown in FIG. 9 or others. The label-seal may be the main label of the packaging or, optionally, may be a secondary label, applied between the neck and the cover of a packaging, as shown in FIG. 8 or be used in other arrangements.

The invention claimed is:

1. A method for manufacturing a plurality of label-seals, each label-seal comprising a self-adhesive label, and at least one seal, each seal comprising a heat-shrinkable plastic film, the method comprising the steps of:

feeding a self-adhesive material, the material comprising a tape, an intermediate adhesive layer, and a liner coupled to the tape via the adhesive layer;

printing at least one first printing layer successively onto a tape region of the tape to form each corresponding label;

cutting and extracting at least one unprinted tape region of the tape adjacent to the printed tape region;

mounting at least one heat-shrinkable plastic film onto the printed tape region of the tape to form each corresponding seal; and cutting and separating the label-seals on the liner by removing skeleton portions of the printed tape region and the heat-shrinkable plastic film adjacent to the label-seals.

2. The method according to claim 1, wherein the extracting step further comprises the step of:

extracting an upper tape region of the tape adjacent to the printed tape region.

3. The method according to claim 2, further comprising the step of printing at least one second printing layer successively onto the at least one heat-shrinkable plastic film, subsequent to the mounting step.

4. The method according to claim 3, further comprising the step of performing a plurality of parallel cuts onto the at least one heat-shrinkable plastic film to form at least one accommodation stripe, subsequent to the step of printing the at least one second printing layer onto the at least one heat-shrinkable plastic film.

5. The method according to claim 3, further comprising the step of punching the at least one heat-shrinkable plastic film to form at least one punching line, subsequent to the step of printing the at least one second printing layer onto the at least one heat-shrinkable plastic film.

6. The method according to claim 2, wherein the mounting step further comprises the steps of:

separating the printed tape region from the liner;

mounting a heat-shrinkable plastic film onto the printed tape region, such that an upper edge of the printed tape region substantially overlaps and adheres over a corresponding edge of the heat-shrinkable plastic film facing the printed tape region via the adhesive layer; and adhering the liner to the printed tape region and the heat-shrinkable plastic film.

7. The method according to claim 2, wherein the mounting step further comprises the steps of:

applying a glue fillet over an upper edge of the printed tape region; and mounting a heat-shrinkable plastic film onto the printed tape region, such that a corresponding edge of the heat-shrinkable plastic film facing the printed tape region substantially overlaps and adheres over the upper edge of the printed tape region via the applied glue fillet.

8. The method according to claim 1, wherein the extracting step further comprises the step of:

extracting an upper tape region and a lower tape region of the tape adjacent to the printed tape region.

9. The method according to claim 8, wherein the mounting step further comprises the steps of:

separating the printed tape region from the liner;

mounting a heat-shrinkable plastic film onto the printed tape region, such that an upper edge of the printed tape region substantially overlaps and adheres over a corresponding edge of the heat-shrinkable plastic film facing the printed tape region via the adhesive layer;

mounting a further heat-shrinkable plastic film onto the printed tape region, such that a lower edge of the printed tape region substantially overlaps and adheres over a corresponding edge of the further heat-shrinkable plastic film facing the printed tape region via the adhesive layer; and adhering the liner to the printed tape region, the heat-shrinkable plastic film, and the further heat-shrinkable plastic film.

10. The method according to claim 8, wherein the mounting step further comprises the steps of:

applying a glue fillet over an upper edge and a lower edge of the printed tape region;

mounting a heat-shrinkable plastic film onto the printed tape region, such that a corresponding edge of the heat-shrinkable plastic film facing the printed tape region substantially overlaps and adheres over the upper edge of the printed tape region via the applied glue fillet; and mounting a further heat-shrinkable plastic film onto the printed tape region, such that a corresponding edge of the further heat-shrinkable plastic film facing the printed tape region substantially overlaps and adheres over the lower edge of the printed tape region via the applied glue fillet.

* * * * *